US009137768B1

(12) United States Patent
Singh et al.

(10) Patent No.: US 9,137,768 B1
(45) Date of Patent: Sep. 15, 2015

(54) DYNAMICALLY CONTROLLING OVERLAY OF TRACKING AREAS UPON SMALL CELL INITIATION

(71) Applicant: Sprint Spectrum L.P., Overland Park, KS (US)

(72) Inventors: Jasinder P. Singh, Olathe, KS (US); Saied Kazeminejad, Ashburn, VA (US); Brett Christian, Independence, MO (US); Senthil Veeraragavan, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 123 days.

(21) Appl. No.: 14/040,936

(22) Filed: Sep. 30, 2013

(51) Int. Cl.
*H04W 4/00* (2009.01)
*H04W 60/00* (2009.01)

(52) U.S. Cl.
CPC ..................................... *H04W 60/00* (2013.01)

(58) Field of Classification Search
USPC ............................ 455/422.1, 424, 435.1, 436
See application file for complete search history.

(56) References Cited

U.S. PATENT DOCUMENTS

| 7,477,920 | B2 | 1/2009 | Scheinert et al. | |
|---|---|---|---|---|
| 2009/0305699 | A1* | 12/2009 | Deshpande et al. | 455/434 |
| 2010/0075698 | A1* | 3/2010 | Rune et al. | 455/458 |
| 2010/0210288 | A1* | 8/2010 | Kim et al. | 455/458 |
| 2010/0227627 | A1* | 9/2010 | Ishii et al. | 455/456.2 |
| 2010/0255841 | A1* | 10/2010 | Kubo et al. | 455/435.1 |
| 2011/0045823 | A1* | 2/2011 | Wang et al. | 455/424 |
| 2011/0165878 | A1* | 7/2011 | Nylander et al. | 455/436 |
| 2011/0176530 | A1* | 7/2011 | Vikberg et al. | 370/338 |
| 2012/0069737 | A1* | 3/2012 | Vikberg et al. | 370/232 |
| 2012/0207013 | A1* | 8/2012 | Kamalaraj et al. | 370/218 |
| 2014/0106790 | A1* | 4/2014 | Kakinada et al. | 455/458 |
| 2014/0349570 | A1* | 11/2014 | Pan et al. | 455/11.1 |
| 2014/0376374 | A1* | 12/2014 | Moser et al. | 370/235 |

\* cited by examiner

*Primary Examiner* — Nathan Taylor

(57) ABSTRACT

A method and systems for managing paging congestion are described. A RAN may receive data indicating that a base station located at a particular geographic location is registering with the RAN. Responsive to receiving the data, the RAN may make a determination of whether a number of base stations in a particular tracking area that corresponds with the particular geographic location is greater than a threshold number of base stations. And responsive to making a determination that the number of base stations is greater than the threshold number of base station: the RAN may create a new tracking area having a new tracking area identity (TAI), the RAN may provision the base station with the new TAI rather than the particular TAI, and the RAN may provide the base station with a tracking area list that includes both the new TAI and a particular TAI identifying the particular tracking area.

20 Claims, 7 Drawing Sheets

DYNAMICALLY CONTROLLING OVERLAY OF TRACKING AREAS UPON SMALL CELL INITIATION

BACKGROUND

Unless otherwise indicated herein, the materials described in this section are not prior art to the claims and are not admitted to be prior art by inclusion in this section.

In typical cellular wireless networks, user equipment devices (UEs) such as cell phones, tablet computers, tracking devices, embedded wireless modules, and other wirelessly equipped communication devices subscribe to service from a given cellular wireless service provider. In practice, a service provider will operate one or more networks (sometimes referred to as radio access networks (RANs)) including base stations that radiate to define wireless coverage areas in which the UEs can operate.

Through each base station (and corresponding RAN), a UE can obtain connectivity with one or more transport networks, such as the public switched telephone network (PSTN) and/or the Internet for instance. Each RAN may include one or more radio network controllers (RNCs), mobility management entities (MMEs), or the like, which may be integrated with or otherwise in communication with the base stations, and which may include or be in communication with a switch or gateway that provides connectivity with the one or more transport networks. With this arrangement, a UE within coverage of a RAN may engage in air interface communication with a base station and may thereby communicate via the base station with various remote network entities or with other UEs served by the base station.

In general, a cellular wireless network may operate in accordance with a particular air interface protocol or radio access technology, with communications from the base stations to UEs defining a downlink or forward link and communications form the UEs to the base stations defining an uplink or reverse link. Each of these links may be structured to define particular channels on which certain types of data may be transmitted.

The forward link, for example, may define: (i) a pilot channel on which the RAN may broadcast a pilot signal to allow UEs to detect wireless coverage, (ii) system parameter channels (e.g., an overhead channel) on which the RAN may broadcast system operational parameters for reference by UEs so that the UE can then seek network access, (iii) paging channels on which the RAN may broadcast page messages to alert UEs of incoming communications, and (iv) traffic channels on which the RAN may transmit bearer traffic (e.g., application data) for receipt by UEs. The reverse link, for example, may define: (i) access channels on which UEs may transmit "access probes" such as registration messages and call origination requests, and (ii) traffic channels on which UEs may transmit bearer traffic for receipt by the RAN. These channels may be defined through the use of various mechanisms, including for example, time division multiplexing, code division multiplexing (e.g., spread-spectrum modulation), frequency division multiplexing, as well as others.

When a cellular wireless network seeks to page a UE for an incoming call or for some other reason, an MME or switch in the network may send a page message to numerous base stations in the MME or switch's coverage area, with the hope that the UE will receive a page message broadcast by a base station, and the UE will respond. To carry out a page, the MME or switch may transmit some indication of the reason for the page (e.g., that there is an incoming call or data packed directed to the UE) to each of the numerous base stations that the MME or switch sends a page message. In turn, each base station may use this indication to generate a page record, which the base station may transmit to the UE in one way or another. The UE may then reply to one of the base stations with a page-response message (PRM), or some other message indicating successful receipt of the page record.

In operation, a cellular wireless network may implement a "zone-based" paging scheme. In such a scheme, the base stations in the RAN are divided into tracking areas, each with a respective tracking area identity (TAI). To facilitate paging on a zone basis, each base station in the RAN may broadcast as one of its overhead parameters the TAI for the tracking area in which the base station is included. A UE operating in the network may then programmatically monitor the TAI(s) specified in the overhead messages and may register with the network by, for example, transmitting to the RAN a tracking area update (TAU) message when the UE detects that it has moved into a new tracking area (or for other reasons). With this process, registration records maintained by a RAN entity (e.g., an MME or a switch) will indicate the tracking area in which each UE last registered. When the RAN seeks to page a certain UE, the RAN entity may then refer to the registration records to determine which base station(s) to send a page message to in accordance with a particular paging strategy.

Using an example paging strategy that is implemented in many cellular wireless networks, for instance, the network may make up to three attempts to page a UE that last registered with a particular base station. In particular, the network may first attempt to transmit a page record to the UE using the particular base station (i.e., the particular base station would transmit the page record). Then, if the first attempt is unsuccessful (i.e., the UE does not acknowledge the page record), the network may make a second attempt to page the UE by transmitting the page record in a tracking area in which the UE is registered (i.e., each of the base stations in a tracking area in which the UE is registered would transmit the page record). If the second attempt also fails, then the network may make a third attempt to page the UE, possibly with a system-wide transmission of the page record (i.e., in all tracking areas served by the MME or switch that serves the tracking area in which the UE last registered), although it is possible that a third attempt may be of a different scope as well.

OVERVIEW

As a result of growth in mobile data traffic, many service providers strategically provide small cells throughout their coverage areas or offer small cells directly to consumers. Small cells are low-powered radio access base stations that address gaps in coverage, offload mobile data traffic from other large scale base stations (often referred to as "macro base stations"), or both. Examples of small cells include femtocells, picocells, and microcells. In general, small cells are smaller in size, weight, and output power than macro base stations. Furthermore, a small cell is equipped with a wireless communication interface that is compatible with UEs of a cellular wireless network, such that the small cell can provide cellular wireless coverage for the UEs of the service provider's network.

To facilitate zone-based paging, when a small cell is powered on at a particular location, the small cell may be provisioned with a TAI identifying a particular tracking area. For instance, the small cell may be provisioned to be part of a particular tracking area, and provisioned with a TAI identifying the particular tracking area. The small can then broadcast the TAI as one of its overhead parameters. The provisioning of the small cell with the TAI may be part of a configuration and authorization process, for example, in which the small cell requests authorization to operate at the particular location and receives one or more operating parameters.

While macro base stations are typically permanently affixed to a cell tower or building to support a large number of subscribers within a wide coverage area, small cells often support a limited number of subscribers within a smaller coverage area and are easier to deploy. For instance, based on a consumer's own preferences and/or coverage needs, the consumer can individually determine a location in which to deploy a small cell. Similarly, in many cases, a consumer can also relocate a small cell to a different building or outdoor area if the consumer desires. As a result of the ease of deployment and portability of small cells, the location in which a small cell will be deployed can vary over time and is often difficult to foresee.

Unfortunately, the inability to predict the location in which a small cell will be deployed can be problematic in a zone-based paging scheme, and particularly, when provisioning a TAI to a small cell that is registering with the network. Randomly including a small cell in an existing tracking area can adversely affect the paging abilities of an MME or switch of a RAN. For instance, including the small cell in a tracking area that already includes a large number of base stations may constrain the MME or switch's ability to efficiently page UEs operating in the tracking area. For instance, if too many base stations are included in a given tracking area, paging throughout the tracking area may require excessive signaling to trigger paging by all the base stations included in the given tracking area. The excessive signaling could overload the network or perhaps the MME or switch, for example. In practice, an MME or a switch may have paging capacity limits. Particularly, an MME or a switch may be constrained by the number of base stations per tracking area for which that MME or switch can manage the paging process. Such a limit may be the result of the MME or switch's hardware or processing constraints, for instance. By way of example, an MME's paging capacity limit may be about twenty to thirty base stations per tracking area; however, other limits are possible as well.

Disclosed herein is a method and corresponding system to help overcome this problem. In accordance with the disclosure, responsive to receiving data indicating that a base station located at a particular geographic location is registering with the RAN, the RAN will provision the base station with a TAI. Advantageously, the TAI that the RAN provisions to the base station can depend on the paging capabilities of an MME or switch of the RAN that is configured to handle paging for a particular tracking area that corresponds with the particular geographic location. For instance, by comparing the number of base stations in the particular tracking area to a threshold number of base stations, the RAN can make a determination of whether the MME or switch would still be able to efficiently manage paging for the particular tracking area if the base station was added to the particular tracking area.

In one example, if the RAN makes a determination that the number of base stations in the particular tracking area is greater than the threshold number of base stations, the RAN can automatically establish a new tracking area having a new TAI, and provision the base station with the new TAI rather than a particular TAI identifying the particular tracking area. It is possible that a geographic area encompassed by the new tracking area (or a portion of the new tracking area) may overlay a geographic area corresponding with the particular tracking area; however, the new tracking area and the particular tracking area can each include different base stations and, significantly, can each include a number of base stations that is less than a paging capacity limit of an MME or switch. Consequently, the ability of an MME or switch to efficiently page UEs in the particular tracking area during a tracking-area-wide page (i.e., when paging a given UE via all of the base stations in the particular tracking area) may be conserved.

Additionally, in some examples, in response to the RAN making a determination that the number of base stations in the particular tracking area is greater than the threshold number of base stations, the RAN can automatically establish a tracking area list that includes both the new TAI and the particular TAI. Further, the RAN can provide the tracking area list to the base station, causing the base station to broadcast the tracking area list to one or more UEs operating in a coverage area of the base station. As a result, the one or more UEs operating in the coverage area of the base station can compare TAI(s) specified in overhead messages to TAIs of the tracking area list, and can forgo sending a TAU message to the RAN when moving between tracking areas that are identified in the tracking area list.

Moreover, in accordance with a zone-based paging scheme, in response to encountering a trigger to page one of the UEs that is operating in the coverage area of the base station and is registered in the new tracking area, the RAN can responsively page the UE by, for example: (1) paging the UE via the base station; (2) then responsive to the RAN not receiving a response from the UE in reply to paging the UE via the base station, paging the UE via all base stations in the new tracking area; and (3) then responsive to the RAN again not receiving a response from the UE, paging the UE via all base station stations in all of the tracking areas of the tracking area list.

Accordingly, in one respect, disclosed is a method that may be implemented in a wireless communication system in which a RAN defines a plurality of tracking areas. The disclosed method may involve the RAN receiving data indicating that a base station located at a particular geographic location is registering with the RAN. Further, the method may involve, responsive to the RAN receiving the data indicating that the base station located at the particular geographic location is registering with the RAN, the RAN making a determination of whether a number of base stations in a particular tracking area that corresponds with the particular geographic location is greater than a threshold number of base stations. The particular tracking area may have a particular TAI. The method may then involve, responsive to the RAN making a determination that the number of base stations in the particular tracking area is greater than the threshold number of base stations: (i) the RAN creating a new tracking area having a new TAI, (ii) the RAN provisioning the base station with the new TAI rather than the particular TAI, and (iii) the RAN providing the base station with a tracking area list that includes both the new TAI and the particular TAI, causing the base station to broadcast the tracking area list to one or more UEs in a coverage area of the base station.

In another respect, disclosed is a system in a wireless communication system. In the wireless communication system, a RAN may define a plurality of tracking areas. The system may include a processor and data storage comprising instructions executable by the processor. The instructions may be executable by the processor to encounter a trigger to provision a base station located in a particular geographic area with a TAI. The particular geographic area may correspond with a particular tracking area, and the particular tracking area may have a particular TAI. Further, the instructions may be executable by the processor to, responsive to encountering the trigger, make a determination of whether a number of base stations in the particular tracking area is greater than a threshold number of base stations. The instructions may also be executable by the processor to, responsive to making a determination that the number of base stations in the particular tracking area is greater than the threshold number of base stations: (i) create a new tracking area having a new TAI, (ii), provision the base station with the new TAI rather than the particular TAI, and (iii) provide the base station with a tracking area list that includes both the new TAI and the particular TAI, causing the base station to broadcast the tracking area list to one or more UEs in a coverage area of the base station.

Further, in still another respect, disclosed is a non-transitory computer readable medium having stored thereon instructions executable by a processing unit to carry out functions. The functions may be carried out in a wireless communication system in which a RAN defines a plurality of tracking areas. The functions may involve receiving data indicating that a base station located at a particular geographic location is registering with the RAN. Further, the functions may involve, responsive to receiving the data indicating that the base station located at the particular geographic location is registering with the RAN, making a determination of whether a number of base stations in a particular tracking area that corresponds with the particular geographic location is greater than a threshold number of base stations. The particular tracking area may have a particular TAI. The functions may then involve, responsive to making a determination that the number of base stations in the particular tracking area is greater than the threshold number of base stations: (i) creating a new tracking area having a new TAI, (ii) provisioning the base station with the new TAI rather than the particular TAI, and (iii) providing the base station with a tracking area list that includes both the new TAI and the particular TAI, causing the base station to broadcast the tracking area list to one or more UEs in a coverage area of the base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
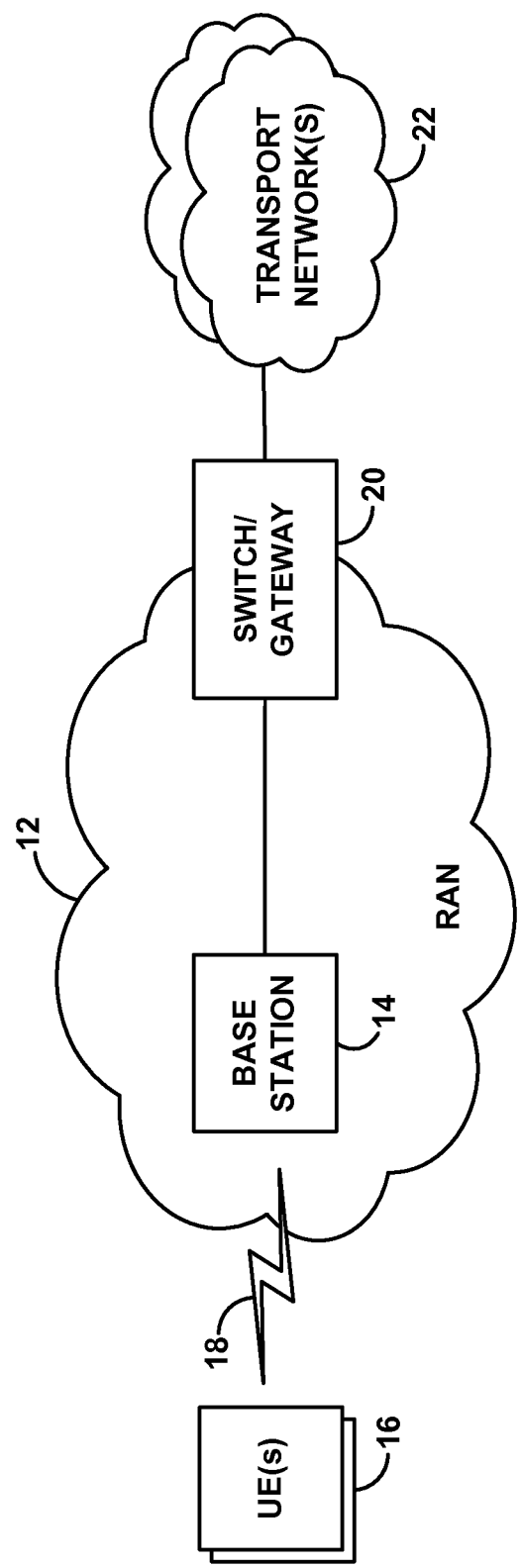
FIG. 1 is a simplified block diagram of an example wireless communication system in which the present disclosure can be implemented.

Referring to the drawings, as noted above, FIG. 1 is a simplified block diagram of a wireless communication system in which the present disclosure can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the example communication system as including at its core a RAN 12 having a representative base station 14, base station 14 being arranged to serve UEs 16 in a coverage area through an air interface 18. The base station may be a macro base station that is positioned at a fixed location and providing fairly wide coverage from that location. Alternatively, the base station may be a small cell that is currently located at a particular location and may provide more restricted coverage from that location.

RAN 12 further includes one or more switches or gateways 20 that provide connectivity with one or more transport networks 22, such as the PSTN or the Internet for instance. With this arrangement, each UE that is in coverage of one of the base station and that is suitably equipped may register or attach with the RAN and may engage in air interface communication with the base station so as to communicate in turn with various remote entities on the transport network(s) and/or with other UEs served by the RAN.

In this arrangement, the air interface 18 may be configured according to a particular air interface protocol, and the UEs and base station may be programmed or otherwise configured to operate according to that protocol. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. According to the air interface protocol, air interface 18 may thus define a plurality of resource blocks for carrying communications between the UEs and the base station.

FIG. 1 generally represents any wireless communication system in which the present disclosure can be implemented, and, as noted above, variations on the arrangement shown are possible. To help illustrate features of the present disclosure, the remainder of this document will focus on an LTE system by way of example. Those of ordinary skill in the art will readily appreciate, however, that the disclosed principles can be applied as well in other types of wireless communication systems, with variations where appropriate. By way of example, in a CDMA system configured to operate according to the IS-2000 standard (sometimes referred to as 1xRTT) or the IS-856 standard (sometimes referred to as 1xEV-DO), the base station is usually referred to as a base transceiver station (BTS) and is usually under the control of a base station controller (BSC) that is coupled with a switch, such as a mobile switching center (MSC). Therefore, a switch in a CDMA system, for instance, may be arranged to perform any of the functions that are performed by an MME in an LTE system in accordance with the present disclosure.

Figure 2:
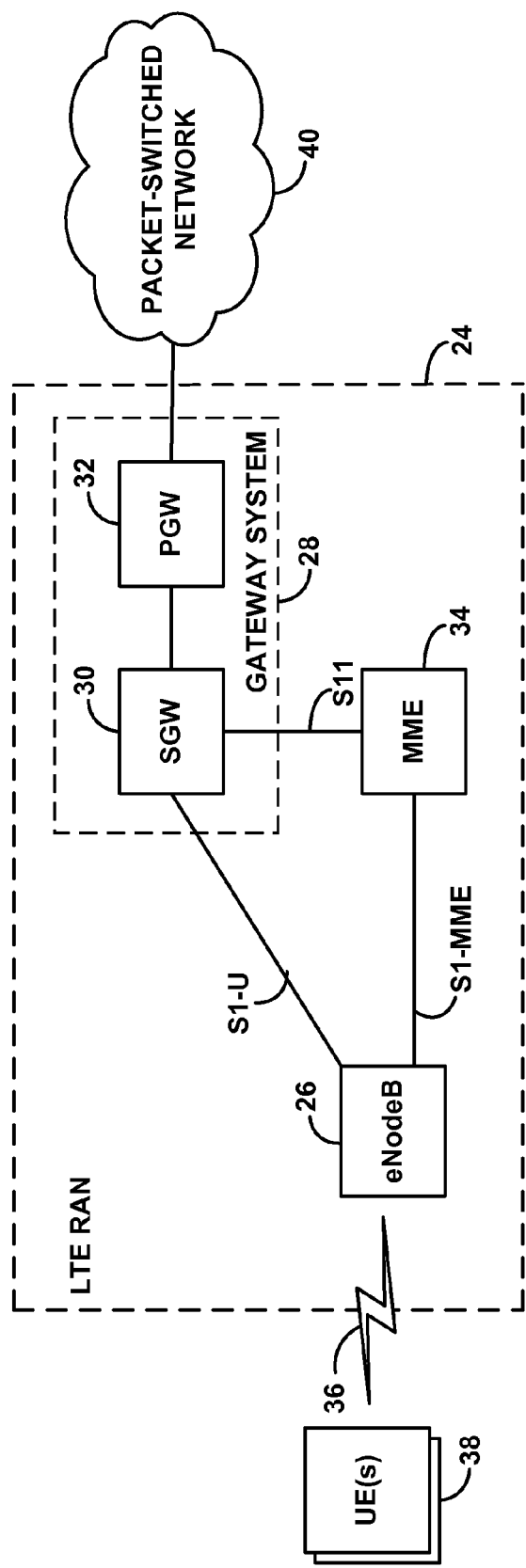
FIG. 2 is a simplified block diagram of an example LTE system in which the present disclosure can be implemented

Accordingly, FIG. 2 is a simplified block diagram of a representative LTE system as an example of the system shown in FIG. 1. As shown in FIG. 2, the LTE system includes an LTE RAN 24 that primarily serves UEs with wireless packet data communication service (but may also provide voice call service, such as voice-over-IP service or circuit-switched fallback service). The LTE RAN 24 is shown including a representative LTE base station 26 known as an eNodeB, a gateway system 28 including a serving gateway (SGW) 30 and a packet data network (PDN) gateway (PGW) 32, and a mobility management entity (MME) 34.

In practice, eNodeB 26 includes an antenna structure and associated equipment for engaging in LTE communication over an LTE air interface 36 with UEs 38, and the PGW 32 provides connectivity with a packet-switched network 40 such as the Internet. Further, the eNodeB communicates with the SGW over an S1-U interface, the eNodeB communicates with the MME over an S1-MME interface, and the MME communicates with the SGW over an S11 interface. Although each of these interfaces is shown as a direct link in the figure, in practice the various elements of the LTE RAN may sit as nodes on a wireless service provider's core packet network, and so these and other interfaces described herein may instead be logical connections over that packet network.

With this arrangement, when a UE enters into coverage of the eNodeB, the UE may normally transmit to the eNodeB an LTE attach request message seeking to be served by the eNodeB, and the eNodeB would forward the attach request to the MME. In response, the MME may then create an evolved packet system (EPS) bearer identity for the UE, the MME would establish a context record for the UE, and the MME would send to the SGW a create-session request message specifying the bearer identity. The SGW may then create an entry for the UE in an EPS bearer table that the SGW maintains, designating an address or other identifier of the serving eNodeB, and would send a create-session response to the MME. And the MME may responsively send to the eNodeB an attach-accept message providing the bearer ID (and perhaps providing the address or other identifier of the SGW), and the eNodeB may send a corresponding attach-accept message to the UE and allocate a radio bearer identity for use by the UE.

Figure 3:
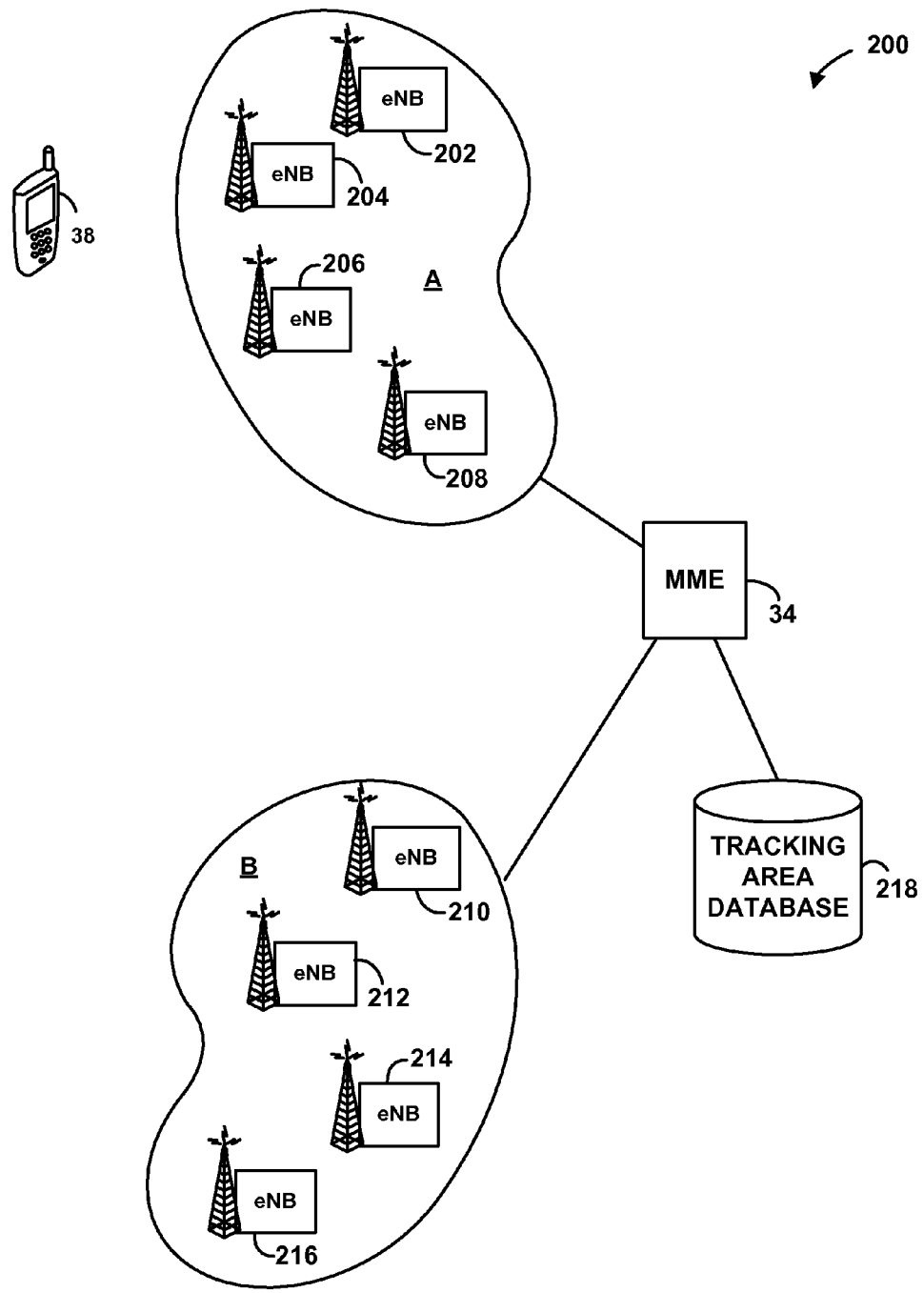
FIG. 3 is simplified block diagram depicting an example arrangement of tracking areas in which the present disclosure can be implemented.

As discussed above, base stations of a network may be divided into tracking areas to facilitate zone-based paging. FIG. 3 is next a simplified block diagram depicting an example arrangement of tracking areas in which the present disclosure can be implemented. As shown in FIG. 3, an example network 200 may include eight eNodeBs 202-216 that are grouped into two tracking areas, tracking area A and tracking area B, to facilitate paging of subscriber UEs operating in network 200. In practice, tracking areas A and B may include additional or fewer eNodeBs instead.

As further shown, network 200 includes MME 34, which includes or is communicatively coupled to tracking area database 218. Tracking area database 218 may store information that indicates which tracking area(s) each eNodeB is a part of. Note that in some instances, different sectors of a given eNodeB may be included in separate tracking areas (not shown). For example, a first sector of the given eNodeB may be included in a first tracking area while a second sector of the given eNodeB may be included in a second tracking area.

Tracking area database 218 may also store information that correlates geographic areas to tracking areas. For instance, tracking area database 218 may store information that correlates counties to tracking areas, cities to tracking areas, and/or zip code areas to tracking areas. As an example, tracking area database 218 may include a table that has a list of cities. For each city of the list, the table may further include an indication of a particular tracking area corresponding with the city. The indication may be a tracking area code (TAC) that is unique within a public land mobile network (PLMN), for example. In practice, each eNodeB may broadcast a mobile network code and mobile country code, which together form a PLMN-ID. In addition, each eNodeB may broadcast a TAC. Together, each combination of a TAC and a PLMN-ID forms a TAI that serves as a globally unique identifier of a particular tracking area.

Additionally, tracking area database 218 may store information that indicates, for each respective tracking area, a number of base stations in the tracking area. In some examples, the tracking area database 218 may also store user registration information. For instance, user registration information may include location information that indicates the most recent tracking areas in which UEs operating in network 200 last registered and/or a particular eNodeB that each UE last registered with in network 200. In another example, user registration information may be stored in a separate database to which MME 34 is communicatively coupled (not shown).

As mentioned above, to facilitate the tracking and paging of subscriber UEs, an eNodeB may broadcast as one of its overhead parameters the TAI for the tracking area in which the eNodeB is included. In practice, each of eNodeBs 202-208 may be provisioned with a particular TAI during commissioning of the eNodeB (e.g., during installation or maintenance of the eNodeB). For instance, a technician may configure an engineering setting for each eNodeB that specifies a TAI for the eNodeB.

In network 200, for example, eNodeBs 202-208 may be configured to broadcast TM "A" and eNodeBs 210-216 may be configured to broadcast TAI "B". Furthermore, when, for example, UE 38 moves from coverage of one of the eNodeBs in tracking area B into coverage of one of the eNodeBs in tracking area A, such as eNodeB 204, UE 38 may detect the broadcast of TAI "A" by eNodeB 204. Consequently, UE 38 may register in tracking area A by sending a TAU message to MME 34 via eNodeB 204. In response, MME 34 may update the user registration information with an indication that UE 38 is operating in tracking area A, and optionally, an indication that UE 38 last registered with eNodeB 204. Thus, in the event that MME 34 needs to page UE 38, MME 34 may refer to the tracking area database 218, determine that UE 38 last registered with eNodeB 204 as operating in tracking area A, and transmit a page message to eNodeB 204 and/or all of the eNodeBs of tracking area A.

Figure 4:
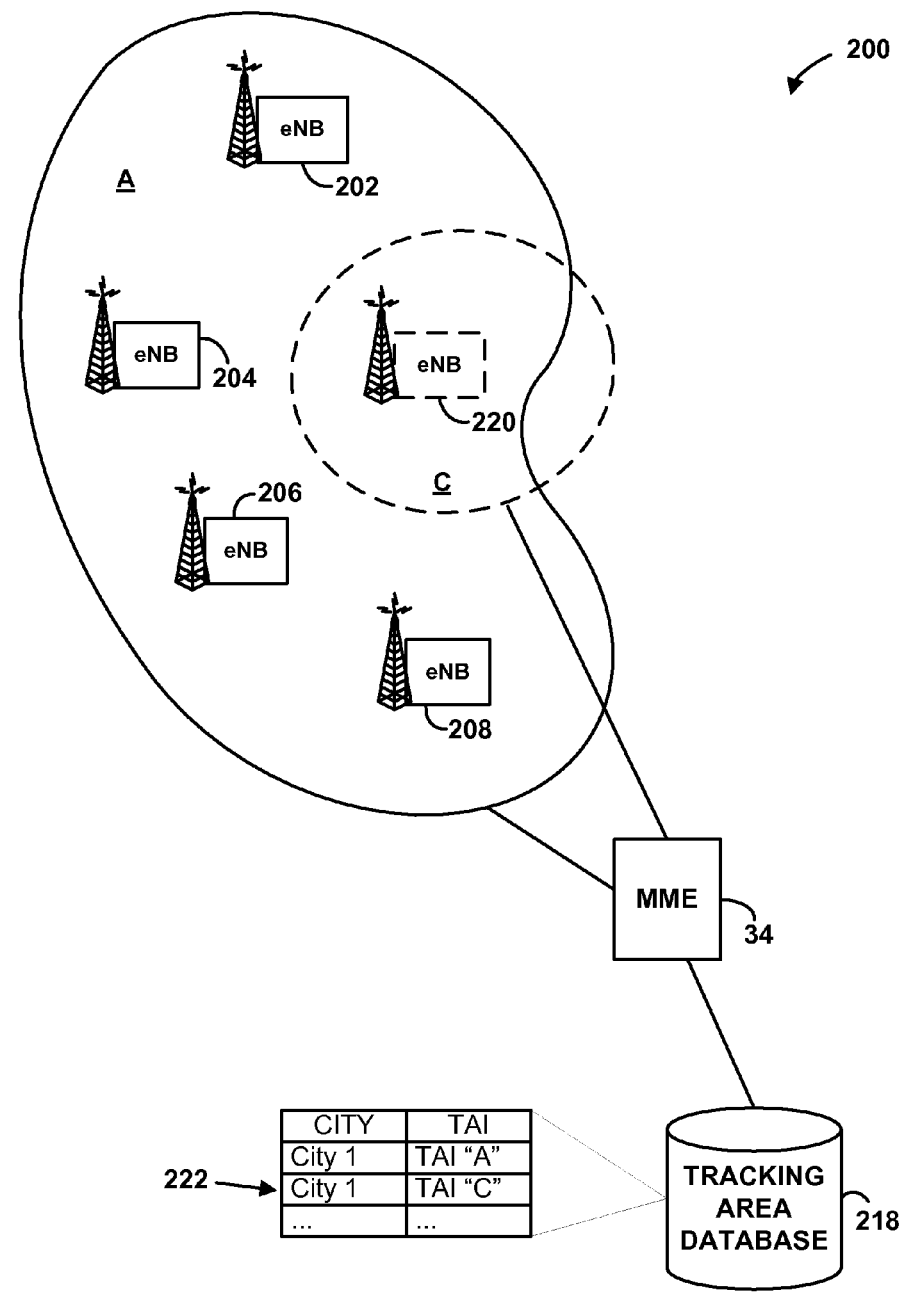
FIG. 4 is another simplified block diagram depicting an example arrangement of tracking areas in which the present disclosure can be implemented.

As also mentioned above, an MME may have paging capacity limits. For instance, if too many eNodeBs are included in a given tracking area, paging throughout the tracking area may require excessive signaling to trigger paging by all the eNodeBs included in the given tracking area. In line with the discussion above, when an MME (or other RAN entity) encounters a trigger to provision a TAI to an eNodeB that is located at a particular geographic location or in a particular geographic area, the particular TAI that the MME provisions to the eNodeB can depend on the paging capabilities of the MME. With reference to FIG. 4, an approach for provisioning an eNodeB with a TAI is next described.

FIG. 4 is a simplified block diagram depicting an example network arrangement of tracking areas in which an eNodeB 220 is registering with the network 200. As depicted, eNodeB 220 is located in a location that corresponds with tracking area A. The eNodeB 220 may be a macro base station. Alternatively, eNodeB may be a small cell, such as a home eNodeB (HeNB), picocell, or microcell.

In one example, MME 34 may receive data indicating that eNodeB 220 is registering with network 200 and data indicating that eNodeB 220 is located at a particular geographic location or located in a particular geographic area. By way of example, the particular geographic location may be a latitude/longitude coordinate pair. The particular geographic area may be a particular city, county, zip code area, etc.

In one instance, eNodeB 220 may include a satellite-based positioning system (SPS) receiver that it uses to receive SPS signals and determine its location. Upon being powered on, or in response to some other command or triggering event, eNodeB 220 may use its SPS receiver to attempt to obtain an initial SPS fix, which may involve receiving signals from multiple satellites and using those signals to compute its location. Further, eNodeB 220 may determine its location with the assistance of a network entity, such as a position determining entity (PDE). For instance, eNodeB 220 may send the data that it receives from multiple SPS satellites to the PDE, and the PDE may then do the necessary calculations and return a location to eNodeB 220. The eNodeB 220 may be configured to determine its location using other location-determination mechanisms as well. Regardless of the location-determination technique utilized by eNodeB 220, eNodeB 220 may send its location to network 200 (e.g., eNodeB 220 may send its location to MME 34).

In response to receiving the data indicating that eNodeB 220 is located at a particular geographic location, MME 34 may then use tracking area database 218 to determine a particular tracking area that corresponds with the particular geographic location. For instance, MME 34 may use tracking area database 218 to determine a geographic area encompassing the particular geographic location, such as a city, county, zip code area, etc., and map the geographic area to the particular tracking area. In the example arrangement of FIG. 4, for instance, MME 34 may determine that the particular geographic location corresponds with tracking area A. Similarly, in response to receiving data indicating that eNodeB 220 is located in a particular geographic area (e.g., a particular city, particular county, particular zip code area, etc.), MME 34 may use tracking area database 218 to map the particular geographic area to the particular tracking area. Again, in the example arrangement of FIG. 4, MME 34 may determine that the particular geographic area corresponds with tracking area A.

In some examples, each of eNodeBs 202-208 may be small cells, and MME 34 may receive data indicating that eNodeB 220 is a small cell registering with network 200. Further, the tracking area database 218 may be a small cell tracking area database that specifically indicates tracking area information for small cells. The tracking area database may indicate small cell tracking areas that are specifically reserved for small cells, for instance. By way of example, the tracking area database may include a table that indicates a small cell TAI for each of multiple predetermined geographic areas (e.g., a specific TAI per city, per county, per zip code area, etc.). MME 34 may then use tracking area database 218 to determine that tracking area A is a small cell tracking area that corresponds with the particular geographic area or the particular geographic location.

Responsive to MME 34 receiving the data indicating that eNodeB 220 is registering with network 200 and is located at a particular geographic location or in a particular geographic area (that has been determined to correspond with tracking area A), MME 34 may make a determination of whether a number of eNodeBs in tracking area A is greater than a threshold number of eNodeBs. In the example arrangement of FIG. 4, the paging capacity limit of MME 34 may be four eNodeBs, and consequently, the threshold number of eNodeBs may be three. One of ordinary skill in the art will appreciate that making a determination of whether the number of eNodeBs in tracking area A is greater than three eNodeBs is the same as making a determination of whether the number of eNodeBs in tracking area A is greater than or equal to four eNodeBs. In practice, to make the determination, MME 34 may refer to tracking area database 218 to determine the number of eNodeBs in tracking area A.

Responsive to MME 34 making a determination that the number of eNodeBs in tracking area A is greater than the threshold number of eNodeBs, MME 34 may automatically perform a number of functions. For instance, MME 34 may create a new tracking area, tracking area C, having a TAI "C" and provision eNodeB 220 with TAI "C" rather than TAI "A". If MME 34 was not configured to operate according to the present disclosure, MME 34 might instead provision eNodeB 220 with TAI "A". As a result, the number of eNodeBs in tracking area A may exceed the paging capacity limit of MME 34, and paging throughout tracking area A may require excessive signaling to rigger page by all the eNodeBs included in tracking area A. By creating tracking area C instead, and provisioning eNodeB 220 with TAI "C" rather than TAI "A", this problem can be avoided. For example, by provisioning eNodeB 220 with TAI "C" rather than TAI "A", the paging capacity limit of MME 34 is not exceeded.

Although tracking area C is shown as being smaller than tracking area A, the example network arrangement in FIG. 4 is not meant to be limiting. For instance, tracking area A and tracking area C may each be the same size or may each be different sizes. Furthermore, the shape of any of the tracking areas of FIGS. 3 and 4 is not meant to be limiting.

In practice, to create a new tracking area, MME 34 may update tracking area database 218. For example, MME 34 may update tracking area database 218 to create a separate tracking area that overlays tracking area A (or a portion of tracking area A). In one instance, as discussed above, tracking area database 218 may include a table having a list of cities, and for each city, an indication of a particular tracking area corresponding with the city. By way of example, tracking area database 218 may include a table that indicates that tracking area A corresponds with a particular city. To create tracking area C, MME 34 may add to the table a new row 222 that indicates that another tracking area, tracking area C, also corresponds with the particular city.

MME 34 may then provision eNodeB 220 with TAI "C". For instance, MME 34 may send to eNodeB 220 over an S1-MME interface a message including TM "C". In response to receiving the message, eNodeB 220 may be programmed to update its TAI to be TAI "C", and broadcast the TAI"C" to one or more UEs operating in a coverage area of eNodeB 220.

In practice, an MME may create and manage tracking area lists to reduce signaling due to TAU messages. A tracking area list is a group of neighboring tracking areas that an MME can provide to UEs operating in one of the neighboring tracking areas so that the UEs can forgo sending a TAU message to the network when moving between the neighboring tracking areas. For example, in FIG. 4, tracking area A and tracking area C are examples of neighboring tracking areas. A UE operating in the network may store a tracking area list and programmatically monitor TAI(s) specified in overhead messages that are broadcast by base stations. When the UE detects that it has moved between two tracking areas that are included in the tracking area list, the UE does not need to send a TAU message. The UE may only need to send a TAU message when the UE enters a new tracking area and detects a TAI that is not in the tracking area list (or when a periodic TAU timer expires).

Accordingly, in some examples, responsive to making the determination that the number of eNodeBs in tracking area A is greater than the threshold number of eNodeBs, MME 34 may automatically provide eNodeB 220 with a tracking area list that includes both TAI "A" and TAI "C". MME 34 can provide the tracking area list that includes both TAI "A" and TAI "C" to eNodeB 220 by sending a message over an S1-MME interface. Upon receiving the tracking area list, eNodeB may be programmed to periodically broadcast the tracking area list to one or more UEs operating in a coverage area of eNodeB 220. For example, eNodeB 220 can periodically broadcast the tracking area list to the UEs operating in the coverage area of eNodeB 220 in an overhead message. A UE operating in the coverage area of eNodeB 220 can then receive and store the tracking area list in a memory of the UE. As the UE programmatically monitors TAI(s) specified in overhead messages, the UE can compare the TAI(s) specified in the overhead messages to TAIs of the tracking area list, and forgo sending a TAU message to the network 200 when moving between tracking area A and tracking area C, for example.

Furthermore, in response to encountering a trigger to page one of the UEs that is operating in the coverage area of eNodeB 220 and is registered in tracking area C, MME 34 can responsively page the UE using a zone-based paging scheme. When implementing a zone-based paging scheme and utilizing tracking area lists, an MME may make three attempts to page a given UE. At a first attempt, the MME may page the UE via an eNodeB with which the UE last registered. If the network does not receive a response from the UE in reply to the first paging attempt, the MME may page the UE via all eNodeBs in a particular tracking area in which the UE is registered. And if the UE does not reply to the second paging attempt, the MME may page the UE via all eNodeBs in all of the tracking areas of a tracking area list that includes the particular tracking area list.

Returning to the example network arrangement of FIG. 4, in line with the zone-based paging scheme described above, MME 34 can page the UE by, for example: (1) paging the UE via eNodeB 220; (2) then responsive to the network not receiving a response from the UE in reply to paging the UE via eNodeB 220, paging the UE via all eNodeBs in tracking area C; and (3) then responsive to the network again not receiving a response from the UE, paging the UE via all eNodeBs in tracking area A and tracking area C.

Similarly, responsive to making the determination that the number of eNodeBs in tracking area A is greater than the threshold number of eNodeBs, MME 34 can provide the tracking area list that includes both TM "A" and TAI "C" to eNodeBs 202-208. Upon receiving the tracking area list, eNodeBs 202-208 may be programmed to periodically broadcast the tracking area list to one or more UEs operating in their respective coverage areas. And MME 34 can also page one or more UEs operating in any of the coverage areas of eNodeBs 202-208 using a zone-based scheme.

Figure 5:
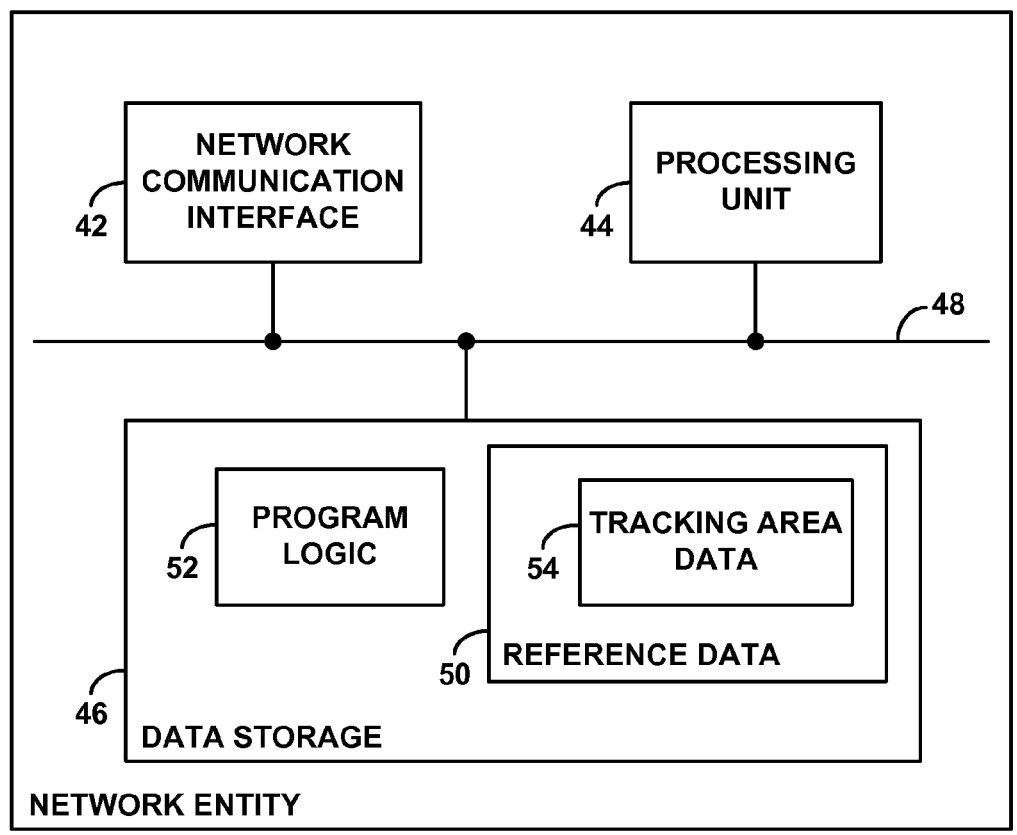
FIG. 5 is a simplified block diagram of a network entity operable in the arrangements of FIGS. 3 and 4.

FIG. 5 is next a simplified block diagram depicting components that may be included in a representative network entity, such as an MME 34 or switch, to facilitate the functions described above. As shown, the entity may include a network communication interface 42, a processing unit 44, and non-transitory data storage 46, all of which may be communicatively linked together by a system bus, network, or other communication mechanism 48.

Network communication interface 42 may function to facilitate communication with various other entities, such as the eNodeB 26 and the SGW 30, for example. As such, the interface 42 may include one or more network interface modules, such as Ethernet network interface modules for instance or may take any of a variety of other forms, supporting wireless and/or wired communication with these and other components.

Processing unit 44 may then comprise one or more general purpose processors (such as microprocessors) and/or one or more special purpose processors (e.g., application specific integrated circuits). And data storage 46 may comprise one or more volatile and/or non-volatile storage components, such as optical, magnetic, or flash storage, and may be integrated in whole or in part with processing unit 44. As shown, data storage 46 may include reference data 50 and program logic 52. Reference data 50 may comprise tracking area data 54 such as that included in the tracking area database described above. And program logic may comprise program instructions that are executable or interpretable by processing unit 44 to carry out various functions described herein, such as (a) receiving data indicating that a base station located at a particular geographic location is registering with a RAN, (b) responsively making a determination of whether a number of base stations in a particular tracking area that corresponds with the particular geographic location is greater than a threshold number of base stations, and (c) responsive to making a determination that the number of base stations in the particular tracking area is greater than the threshold number of base stations: (i) creating a new tracking area having a new TAI; (ii) provisioning the base station with the new TAI; and (iii) providing the base station with a tracking area list that includes both the new TAI and a particular TAI identifying the particular tracking area.

Figure 6:
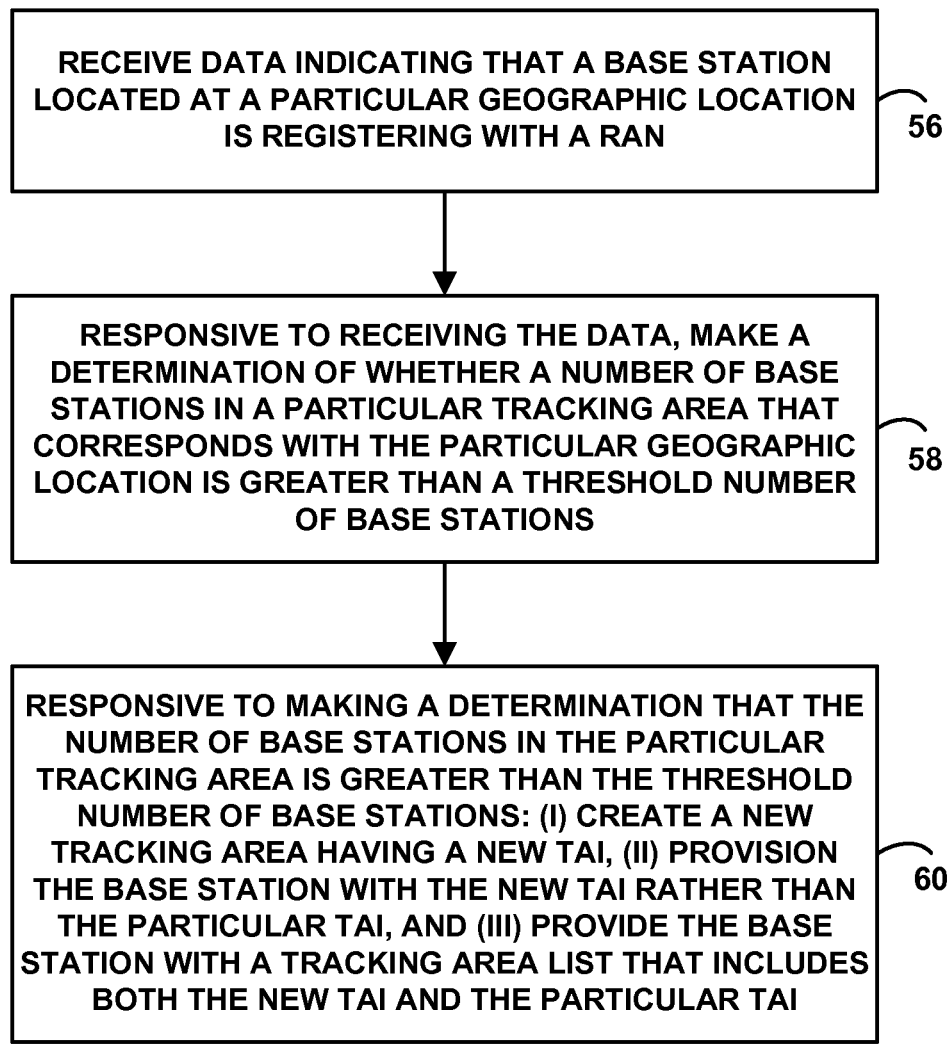
FIG. 6 is a flow chart depicting a method that can be carried out in accordance with the present disclosure.

FIG. 6 is next a flow chart depicting a method that can be carried out in an example wireless communication system. In practice, the system could be arranged as shown in FIG. 1 or FIG. 2. But the functions depicted and described could be applied in other contexts as well.

As shown in FIG. 6, at block 56, the method involves receiving data indicating that a base station located at a particular geographic location is registering with a RAN. At block 58, the method involves, responsive to receiving the data, making a determination of whether a number of base stations in a particular tracking area that corresponds with the particular geographic location is greater than a threshold number of base stations. And at block 60, the method involves, responsive to making a determination that the number of base stations in the particular tracking area is greater than the threshold number of base stations: (i) creating a new tracking area have a new TAI, (ii) provisioning the base station with the new TAI rather than a particular TAI identifying the particular tracking area, and (iii) providing the base station with a tracking area list that includes both the new TAI and the particular TAI.

In line with the discussion above, the base station located at the particular geographic location may be a macro base station or a small cell. Upon being powered on, the base station may determine its location, and provide the location to the RAN. Responsive to an MME or switch (or other network entity) receiving data indicating that the base station is located at the particular geographic location, the MME or switch may determine a particular tracking area that corresponds with the particular geographic location. For instance, the MME or switch may refer to a tracking area database to determine the particular tracking area that corresponds with the particular geographic location. Additionally, the MME or switch may refer to a tracking area database to determine the number of base stations in the particular tracking area.

Furthermore, in line with the discussion above, responsive to the MME or switch making a determination that the number of base stations in the particular tracking area is greater than the threshold number of page stations, the MME or switch may automatically carry out a number of functions. For example, the MME or switch may create a new tracking area having a new TAI. In practice, to create a new tracking area, the MME or switch may update a tracking area database to include a record of the new tracking area. For example, the MME or switch may update the tracking area database to define a separate tracking area that overlays the particular tracking area (or a portion of the particular tracking area A). Additionally, the MME or switch may provision the base station with the new TAI rather than a particular TAI that identifies the particular tracking area. For instance, the MME or switch may send a message that includes the new TAI to the base station over an S1-MME interface. Moreover, the MME or switch may provide the base station with a tracking area list that includes both the particular TAI and the new TAI. Similarly, the MME or switch can provide the tracking area list to one or more other base stations that are in the particular tracking area.

Figure 7:
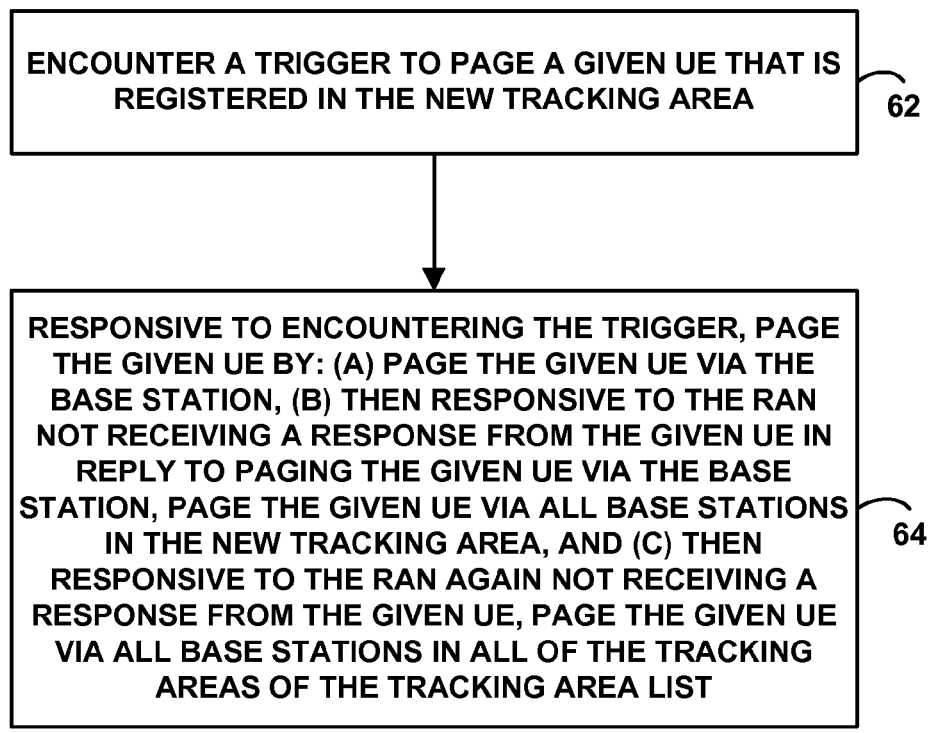
FIG. 7 is another flow chart depicting a method that can be carried out in accordance with the present disclosure.

FIG. 7 is next another flow chart depicting a method that can be carried out in an example wireless communication system. Again, the system could be arranged as shown in FIG. 1 or FIG. 2, but the functions depicted and described could be applied in other contexts as well As shown in FIG. 7, at block 62, the method involves encountering a trigger to page a given UE that is registered in the new tracking area. The trigger may be an incoming voice-call, packet-data message, or other communication that is intended for the given UE, for example. And at block 64, the method involves, responsive to encountering the trigger, paging the given UE by: (a) paging the given UE via the base station, (b) then responsive to the RAN not receiving a particular response from the given UE in reply to paging the given UE via the base station, paging the given UE via all base stations in the new tracking area, and (c) then responsive to the RAN again not receiving a response from the given UE, paging the given UE via all base stations in all of the tracking areas of the tracking area list.

In line with the discussion above, blocks 62 and 64 of FIG. 7 could be carried out along with the method of FIG. 6. Alternatively, the blocks 62, 64 of FIG. 7 could be carried out independently from the method of FIG. 6. Furthermore, blocks 62 and 64 may be carried out by an MME or switch of a RAN, for example, or other network entity.

Various embodiments have been described above. Those skilled in the art will appreciate, however, that changes from the embodiments are possible, while remaining within the scope of the claims.

We claim:

1. In a wireless communication system in which a radio access network (RAN) defines a plurality of tracking areas, wherein each tracking area of the plurality of tracking areas includes one or more base stations of the RAN, and wherein each base station of the RAN is provisioned with a respective tracking area identity (TAI) that the base station is configured to broadcast over an air interface, the TAI identifying a tracking area in which the base station is included, a method comprising:

the RAN receiving data indicating that a base station located at a particular geographic location is registering with the RAN;

responsive to the RAN receiving the data indicating that the base station located at the particular geographic location is registering with the RAN, the RAN making a determination of whether a number of base stations in a particular tracking area that corresponds with the particular geographic location is greater than a threshold number of base stations, the particular tracking area having a particular TAI; and responsive to the RAN making a determination that the number of base stations in the particular tracking area is greater than the threshold number of base stations:

(i) the RAN creating a new tracking area having a new TAI, (ii) the RAN provisioning the base station with the new TAI rather than the particular TAI, and (iii) the RAN providing the base station with a tracking area list that includes both the new TAI and the particular TAI, wherein the base station broadcasts the tracking area list to one or more user equipment devices (UEs) in a coverage area of the base station.

2. The method of claim 1, carried out by a RAN entity selected from the group consisting of a mobility management entity (MME) and a mobile switching center (MSC).

3. The method of claim 1, wherein the base station comprises a small cell.

4. The method of claim 1:

wherein the RAN includes a tracking area database that correlates geographic areas to tracking areas, the method further comprising using the tracking area database to map a geographic area encompassing the particular geographic location to the particular tracking area that corresponds with the particular geographic location.

5. The method of claim 4, wherein the geographic area comprises a geographic area selected from the group consisting of a county, a city, and a zip code area.

6. The method of claim 4:

wherein the tracking area database further includes information that indicates for each respective tracking area a number of base stations in the tracking area, the method further comprising the RAN referring to the tracking area database to determine the number of base stations in the particular tracking area.

7. The method of claim 1, wherein the RAN creating a new tracking area having a new TAI comprises the RAN establishing a separate tracking area that overlays the particular tracking area and the RAN identifying the separate tracking area with the new TAI.

8. The method of claim 1, further comprising the RAN providing the tracking area list to another base station that is in the particular tracking area, wherein the other base station broadcasts the tracking area list to one or more UEs in a coverage area of the other base station.

9. The method of claim 1, further comprising:

the RAN encountering a trigger to page a given UE that is registered in the new tracking area; and responsive to the RAN encountering the trigger, the RAN paging the given UE by:

(a) paging the given UE via the base station, (b) then responsive to the RAN not receiving a response from the given UE in reply to paging the given UE via the base station, paging the given UE via all base stations in the new tracking area, and (c) then responsive to the RAN again not receiving a response from the given UE, paging the given UE via all base stations in all of the tracking areas of the tracking area list.

10. In a wireless communication system in which a radio access network (RAN) defines a plurality of tracking areas, wherein each tracking area of the plurality of tracking areas includes one or more base stations of the RAN, and wherein each base station of the RAN is provisioned with a respective tracking area identity (TAI) that the base station is configured to broadcast over an air interface, the TAI identifying a tracking area in which the base station is included, a system comprising:
  a processor; and
  data storage comprising instructions executable by the processor to:
    encounter a trigger to provision a base station located in a particular geographic area with a TAI, wherein the particular geographic area corresponds with a particular tracking area, the particular tracking area having a particular TAI,
    responsive to encountering the trigger, make a determination of whether a number of base stations in the particular tracking area is greater than a threshold number of base stations, and
    responsive to making a determination that the number of base stations in the particular tracking area is greater than the threshold number of base stations:
      (i) create a new tracking area having a new TAI,
      (ii) provision the base station with the new TAI rather than the particular TAI, and
      (iii) provide the base station with a tracking area list that includes both the new TAI and the particular TAI, wherein the base station broadcasts the tracking area list to one or more user equipment devices (UEs) in a coverage area of the base station.

11. The system of claim 10, wherein encountering the trigger to provision the base station located in the particular geographic area with a TAI comprises receiving from the base station a request to register with the RAN, wherein the request indicates the particular geographic area.

12. The system of claim 11, wherein the base station comprises a small cell.

13. The system of claim 10, wherein creating a new tracking area having a new TAI comprises establishing an additional tracking area for the particular geographic area and identifying the additional tracking area with the new TAI.

14. The system of claim 10, wherein the particular geographic area comprises a geographic area selected from the group consisting of a county, a city, and a zip code area.

15. The system of claim 10, further comprising a tracking area database that correlates geographic areas to tracking areas,
  wherein the instructions further comprise instructions for using the tracking area database to map the particular geographic area to the particular tracking area.

16. In a wireless communication system in which a radio access network (RAN) defines a plurality of tracking areas, wherein each tracking area of the plurality of tracking areas includes one or more base stations of the RAN, and wherein each base station of the RAN is provisioned with a respective tracking area identity (TAI) that the base station is configured to broadcast over an air interface, the TAI identifying a tracking area in which the base station is included, a non-transitory computer readable medium having stored thereon instructions executable by a processing unit to carry out functions comprising:
  receiving data indicating that a base station located at a particular geographic location is registering with the RAN;
  responsive to receiving the data indicating that the base station located at the particular geographic location is registering with the RAN, making a determination of whether a number of base stations in a particular tracking area that corresponds with the particular geographic location is greater than a threshold number of base stations, the particular tracking area having a particular TAI; and
  responsive to making a determination that the number of base stations in the particular tracking area is greater than the threshold number of base stations:
    (i) creating a new tracking area having a new TAI,
    (ii) provisioning the base station with the new TAI rather than the particular TAI, and
    (iii) providing the base station with a tracking area list that includes both the new TAI and the particular TAI, wherein the base station broadcasts the tracking area list to one or more user equipment devices (UEs) in a coverage area of the base station.

17. The non-transitory computer readable medium of claim 16, wherein the instructions further comprise instructions for accessing a tracking area database that correlates geographic areas to tracking areas to map a geographic area encompassing the particular geographic location to the particular tracking area that corresponds with the particular geographic location.

18. The non-transitory computer readable medium of claim 17:
  wherein the tracking area database further includes information that indicates for each respective tracking area a number of base stations in the tracking area, and
  wherein the instructions further comprise instructions for referring to the tracking area database to determine the number of base stations in the particular tracking area.

19. The non-transitory computer readable medium of claim 16, wherein creating a new tracking area having a new TAI comprises establishing a separate tracking area that overlays the particular tracking area and identifying the separate tracking area with the new TAI.

20. The non-transitory computer readable medium of claim 16, wherein the instructions further comprise instructions for:
  encountering a trigger to page a given UE that is registered in the new tracking area; and
  responsive to encountering the trigger, paging the given UE by: (a) paging the given UE via the base station, (b) then responsive to the RAN not receiving a response from the given UE in reply to paging the given UE via the base station, paging the given UE via all base stations in the new tracking area, and (c) then responsive to the RAN again not receiving a response from the given UE, paging the given UE via all base stations in all of the tracking areas of the tracking area list.

* * * * *